Sept. 5, 1939.  B. C. PLACE  2,172,258
FASTENING SHEET METAL MEMBERS
Filed Sept. 19, 1936
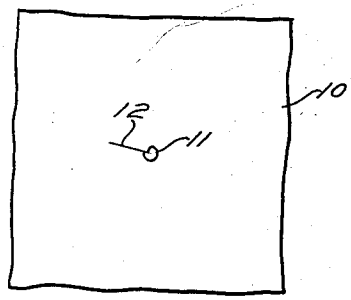
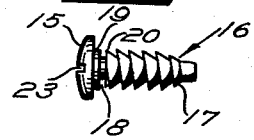
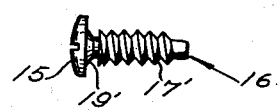
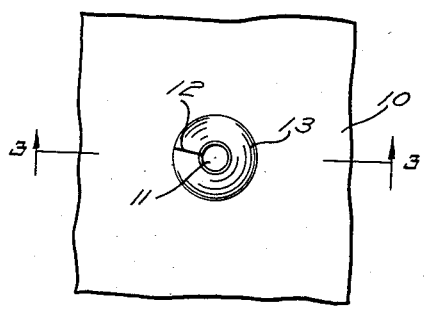
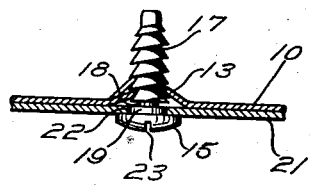
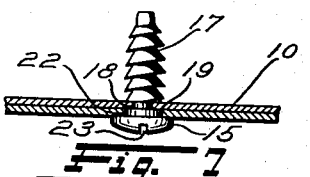
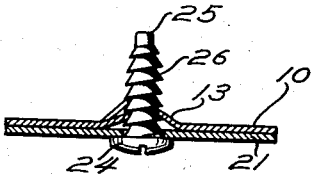
Inventor
Bion C. Place
By Strauch & Hoffman
Attorneys Patented Sept. 5, 1939

2,172,258

UNITED STATES PATENT OFFICE 2,172,258

FASTENING SHEET METAL MEMBERS

Bion C. Place, Detroit, Mich., assignor to Prestole Devices, Inc., Detroit, Mich., a corporation of Michigan Application September 19, 1936, Serial No. 101,673

8 Claims. (Cl. 85—32)

The present invention is concerned with a novel fastener and method for the securing of sheet metal members having aligned openings. More particularly, the invention is concerned with a fastener that is capable of being applied with the facility of a screw, but fixedly holds sheet metal members together in applied position after the manner of a rivet.

Screws, bolts and rivets are now the fasteners commonly employed to secure two overlapped metallic members together. Screws and bolts may be readily applied, but they have the disadvantage that they are liable to become loosened by vibration or the like. Rivets are accordingly used when it is necessary that the members be positively secured together without liability of becoming detached. The chief disadvantage of the use of rivets lies in the expensive handling or manipulation of the parts during the riveting operations, it being generally impracticable to perform the riveting operation except by supporting the parts specially.

The primary purpose of the present invention is to provide a fastener that may be applied with the facility of a screw, but which secures members together with the certainty of characterizing a rivet.

Another object of the invention is to provide a novel threaded fastener having a circumferential groove into which the metal of one of the members, secured by the fastener, is forced upon completion of the operation of threading the fastener into holding position.

Still another object of the invention resides in the provision of a novel combination including specially formed openings in a member to be secured to another member, and a fastener having a threaded shank to be screwed therethrough, and in providing a groove in the shank of the fastener into which the metal adjacent the specially formed opening in said member is forced upon completion of the operation of threading the fastener through the opening.

Still another object of the invention is to provide an improved fastener having a buttress thread and a circumferential groove into which the spiral groove formed by the buttress thread opens, said buttress thread being arranged so as to force the metal of one of the members secured by the fastener into the circumferential groove whereby the fastener cannot be disengaged by an unscrewing action.

Another object of the invention resides in the provision of an improved method for, in effect, riveting two superposed members having aligned openings into fixedly secured relation to each other.

Still further objects of the invention will appear as the description thereof proceeds with reference to the accompanying drawing in which:

Figure 1 is a fragmentary plan view of a sheet metallic member provided with a specially formed opening essential to the use of the novel fastener of the present invention.

Figure 2 is a view similar to Figure 1, but showing the metal member after it has been subjected to a die-shaping operation to bring the portion adjacent said opening into the desired form for the reception of a threaded fastener.

Figure 3 is a sectional view taken on the plane indicated by the line 3—3 in Figure 2.

Figure 4 is a side view of the preferred form of fastener forming an important part of the present invention.

Figure 5 is a modified form of fastener.

Figure 6 is a fragmentary sectional view showing the fastener in the position it occupies just before forcing a part of one of the metal members into the circumferential groove adjacent the head thereof.

Figure 7 is a view similar to Figure 6, but showing the fastener in its final or holding position.

Figure 8 is a fragmentary sectional view showing a modified arrangement and modified fastener.

Like reference characters indicate like parts throughout the several figures.

The present invention requires the formation of an opening of irregular configuration in one of the members secured by the fastener presently to be described. A fragment of one of said members 10 is provided with an opening 11 of special configuration, said opening 11 being of irregular outline as illustrated in Figure 1. A slit 12 radiates from the opening 11. In order to bring the member 10 into the form necessary for the use of a fastener constituting a part of the present invention it is subjected to a die-shaping operation, said operation causing the formation of a conical protuberance 13 formed from the portion of the metal that surrounds the opening 11. In forming the protuberance 13, the opening 11 is enlarged and brought into circular form as illustrated in Figure 2. The wall 14 of the opening is disposed so as to form a helix having a pitch equal to the pitch of the screw of the fastener presently to be referred to. The metal at one side of the slit 12 is disposed substantially higher than that of the other side as illustrated in Figure 3, space being thus provided for the passage of the thread of the screw through said slit. The formation of the opening of the member 10, illustrated in Figures 2 and 3, just briefly described, is more fully described in application Serial No. 87,292, filed June 25, 1936.

The preferred form of fastener, illustrated in Figure 4 of the drawing, comprises a head 15 and a shank 16. The shank 16 is provided with a screw thread 17 extending from the end of the shank inwardly toward the head. Preferably, the thread 17 is a buttress thread, as illustrated, for a purpose later to be described. A circumferential groove 18 is formed in the shank adjacent head 15, the depth of the groove 18 being preferably greater than the depth of the spiral groove formed by thread 17. The shank of the fastener also, preferably, includes a part 19 of cylindrical form, and, preferably, of larger diameter than the diameter at the bottom of the groove 18. Groove 18 thus provides a shoulder 20 at the end of the threaded portion of the shank. The spiral groove formed by the thread 17 opens into the circumferential groove 18, that is, the spiral groove extends into said circumferential groove.

The fastener just described is used in the manner illustrated in Figures 6 and 7, Figure 6 showing the position of the fastener after it has been threaded in the outer member 10 by engagement with the helical wall 14 of the protuberance 13. 21 designates a fragment of the member that is to be secured to the member 10. Member 21 is provided with circular opening 22 having a diameter equal to the diameter of the portion 19 of the fastener so that when the screw is in holding position the member 21 cannot shift with respect to the screw. The fastener is brought into the position illustrated in Figure 6 by turning the threaded portion through the conical protuberance until the head 15 of the fastener contacts with the under surface of the member 21.

Further rotation of the fastener, by means of a screw driver in the slot 23, causes the conical protuberance 13 to be flattened and upon further rotation of the screw the sheet metal is caused to be moved into the circumferential groove 18 and in back of the shoulder 20. The diameter of the fastener at the bottom of the groove 18 preferably is slightly greater than the minimum cross dimension of the irregular opening 11 so that when the metal of the conical protuberance is forced back into its original plane the shank of the fastener at the bottom of the circumferential groove 18 will be firmly gripped so that the fastener fits snugly in the opening in the member 10. After the fastener has been turned to the position illustrated in Figure 7, it will be understood that the members 10 and 21 are secured together after the manner of a rivet. Inasmuch as the conical protuberance 13 has been flattened and the metal is incapable of re-entering the spiral groove formed by the thread 17, the member 10 cannot accordingly be detached from the member 21 without cutting or breaking the fastener as is necessary in a riveted connection. Inasmuch as the buttress thread 17 presents a surface to the conical protuberance more nearly parallel to the plane of the outer surface of the sheet metal member 10 such a thread is more effective in flattening the conical protuberance than an ordinary tapered thread. However, a fastener having a thread of any other known form may be used and the present invention contemplates the use of such a fastener.

The modified form of fastener illustrated in Figure 5 of the drawing comprises an ordinary tapered thread 17'. Of course, a square thread may be employed. In this form of the invention a conical portion 19' is used instead of the cylindrical portion 19 of the fastener before described. The function of the conical portion 19' is the same as the function of the cylindrical portion 19, that is, it serves to prevent shifting of the metal member with respect to the screw, the base of the cone being formed to snugly fit in the opening in said member.

In the modification of the invention illustrated in Figure 8, the outer sheet metal member 10 is provided with a conical protuberance of the kind illustrated in Figures 2 and 3, and said member is secured to the member 21 by means of a further modified form of fastener comprising a head 24 and a shank 25 having a buttress thread 26 formed from the end thereof inwardly toward the head 24. In this form of the invention no groove is formed in the shank 25 adjacent the head 24. In securing the member 10 to the member 21 in Figure 8 the screw is threaded through the conical protuberance 13 until the head contacts with the outside of the member 21. Upon further rotation of the screw the flat under surface of the buttress thread 26 forces the edge of the conical protuberance toward the outer surface plane of the member 10. Said edge accordingly firmly grips the screw until further rotation thereof is prevented, reliance being placed upon the gripping of the edge of the conical protuberance of the screw to prevent reverse rotation thereof. In this form of the invention the holding action is similar to that of application Serial No. 87,292, already referred to, and reliance is placed on the frictional or biting grip of the edge of the conical protuberance on the shank of the fastener to prevent reverse rotation of the screw. The buttress thread of this form of the invention is very effective in causing the edge of the protuberance to be forced inwardly toward the shank. A tapered thread has some tendency to enlarge the opening. For this reason the buttress thread constitutes an important part of the invention of the modification illustrated in Figure 8. Of course, a square thread, which is the full equivalent of a buttress thread in the present situation, may also be used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fastener having a head and a shank, said shank having a portion adjacent said head formed to engage the walls of an opening in one of the members secured by the fastener, a spiral groove formed in said shank from the end thereof remote from said head, and a circumferential groove between said portion and said spiral groove having a width corresponding to the thickness of the member engaged by the fastener, said spiral groove extending into said circumferential groove.

2. A threaded fastener designed for threading into a sheet metal member having a head and a shank provided with a circumferential groove of greater depth than the depth of the groove formed by the thread, said groove being disposed between said head and the thread, and a shank portion between said head and said circumferential groove and spacing said last named groove from said head.

3. In combination, two superposed members having aligned openings, and a fastener having a head bearing against one of said members adjacent the opening therein, and a shank passing through and snugly fitting in the openings, said shank having a groove of a width corresponding to the thickness of one of said members providing an annular shoulder lapping said last named member and bearing firmly against said member adjacent said opening and a threaded portion beyond said shoulder and commencing at a point adjacent the outer side of said member.

4. In combination, two superposed members having aligned openings, one of said members having a slit extending radially of its opening, and a fastener having a head bearing against one of said members, and a shank passing through and snugly fitting in the openings, said shank having an annular shoulder parallel to said head and spaced from said head a distance equal to the combined thickness of said members and bearing against said member having a slit and lapping said last named member, and a threaded portion beyond said shoulder, the pitch of the thread of said last named portion substantially exceeding the thickness of said member having the slit.

5. In combination, two superposed members having aligned openings, one of said members having a slit extending radially of its opening, and a fastener having a head bearing against one of said members, and a shank passing through the openings, said shank having a cylindrical portion fitting snugly in the opening in the other of said members, and a shoulder parallel to said head spaced from said head a distance equal to the sum of the thicknesses of said members and bearing firmly against said member having a slit and lapping said last named member, and a threaded portion beyond said shoulder.

6. A headed fastener having a shank comprising a cylindrical portion formed to fit within an opening in a member secured by the fastener, a second cylindrical portion of different diameter from said first portion and formed to fit snugly in an opening in a second member through which said fastener is threaded, and a threaded portion beyond said last named portion having a spiral groove of a pitch exceeding the length of said second named cylindrical portion.

7. In combination, two superposed sheet metal members having aligned openings of different diameters and cylindrical shape, said members being flat and in contact with each other around said openings, and a threaded fastener having a head bearing against one of said members and cylindrical shank portions of different diameters fitting snugly in the openings in said members, and a threaded shank portion wider than one of said first named cylindrical shank portions extending away from the other member and providing a substantially complete annular shoulder spaced from said head a distance equal to the combined thickness of said members and overlapping said other member around the opening therein.

8. In combination, two superposed members having aligned openings, and a fastener having a head bearing against one of said members adjacent the opening therein, and a shank passing through the openings, said shank having a groove of a width corresponding to the thickness of the other of said members providing a shoulder lapping and bearing firmly against said other member adjacent the respective opening, and a threaded portion beyond said shoulder, the pitch of said threaded portion substantially exceeding the thickness of said other member.

BION C. PLACE.